Sept. 22, 1964 G. E. MAY 3,149,857
HAND PROPELLED AMUSEMENT VEHICLE
Filed Oct. 2, 1962 2 Sheets-Sheet 1
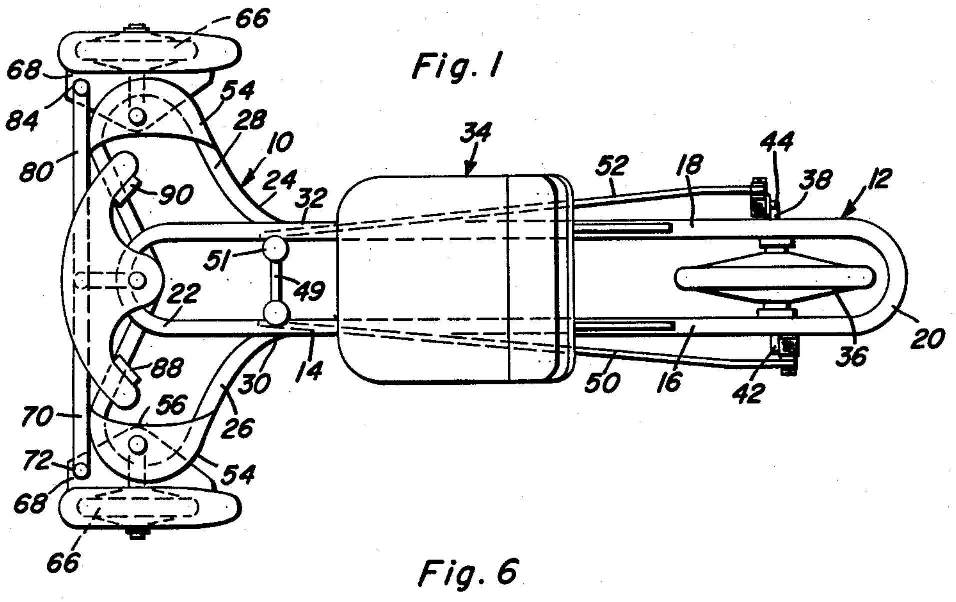
Fig. 1
Fig. 6
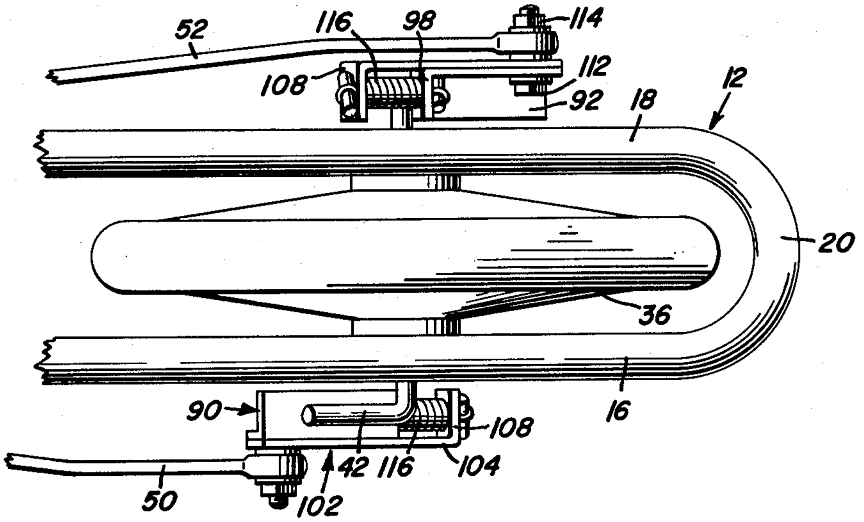
Fig. 7
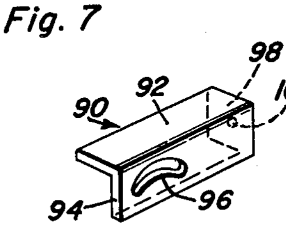
Fig. 8
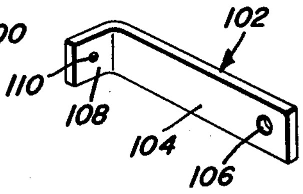
George E. May
INVENTOR.
BY Clarence A. O'Brien
and Harvey B. Jacobson
Attorneys

HAND PROPELLED AMUSEMENT VEHICLE

Filed Oct. 2, 1962 2 Sheets-Sheet 2

George E. May
INVENTOR.

BY Clarence A. O'Brien
and Harvey B. Jacobson
Attorneys

United States Patent Office 3,149,857

Patented Sept. 22, 1964

1

2

3,149,857

HAND PROPELLED AMUSEMENT VEHICLE

George E. May, 2740 N. Kimball Ave., Chicago, Ill.

Filed Oct. 2, 1962, Ser. No. 227,825

9 Claims. (Cl. 280—247)

This invention relates to a novel and useful amusement vehicle and more specifically to a vehicle which is adapted to be propelled by a child by means of a driving connection with a driving wheel of the vehicle which is perhaps most commonly known for its use in the construction of an Irish Mail-type of vehicle.

The Irish Mail-type of vehicle is usually provided with a driving wheel having a crankarm connected thereto. The free end of the crankarm has one end of a connecting rod pivotally secured thereto and the remote end of the connecting rod is pivotally secured to one end of an oscillatable lever. In this manner, the end of the oscillatable lever remote from the connecting rod may be grasped by the operator of the vehicle and oscillated in order to impart rotary motion to the driving wheel of the vehicle.

While an Irish Mail may be readily propelled by small children once it has been put into motion, should the Irish Mail be stationarily disposed with the connecting rod substantially paralleling a line extending between the axis of rotation of the drive wheel and the pivotal connection between the crankarm and the connecting rod, no angular relationship exists between the connecting rod and the crankarm. This stiuation is commonly known as a dead center position in which a force applied to the free end of the actuating lever is ineffective for imparting rotary motion to the driving wheel of a vehicle. When this condition exists, a child operator of the vehicle becomes frustrated, in that he cannot propel the vehicle in the usual manner, and he attempts to force the driving mechanism which of course can impart damage thereto. As an alternative, the child operator of the vehicle may dismount from the vehicle and move it slightly in either a forward or rearward direction so that an angular relationship between the connecting rod and a line extending between the pivotal connection of the connecting rod and the crank and the axis of rotation of the driving wheel of the vehicle will exist. This of course will enable rotary motion to be imparted to the driving wheel of the vehicle upon oscillatory movement of the actuating lever. Still further, the child operator of the vehicle whose driving mechanism is in a center position may rapidly shift his weight in fore and aft directions in an attempt to utilize his momentum to move the vehicle slightly in either direction so that the desired angular relationship above referred to will exist.

As the aforementioned over center position is undesirable, it is the main object of this invention to provide a drive mechanism of the type referred to above including a pivotal connection between the connecting rod and the crankarm of the driving wheel that will enable the axis of rotation of the connecting rod relative to the crankarm to be laterally offset to one side of the line defined between the pivotal connection of the connecting rod to the crankarm and the axis of rotation of the drive wheel.

A further object of this invention, in accordance with the immediately preceding object, is to provide a connection between the connecting rod and the crankarm including means normally yieldably urging the axis of rotation defined by the connection between the crankarm and the connecting rod toward one limit position but enabling the axis of rotation of the pivotal connection to be displaced toward a second limit position upon the application of a force greater than a predetermined amount on the actuating lever of the driving mechanism.

Still another object of this invention is to provide an amusement vehicle including a pair of dirigible front wheels with a steering assembly operatively connected thereto enabling the vehicle to be steered by means of the feet thereby enabling both arms of the operator to be free for actuating a pair of driving mechanisms connected to the same driving wheel of the vehicle or a pair of separate driving wheels of the vehicle.

Another object of this invention is to provide a vehicle having a single drive wheel with a pair of driving mechanisms operatively connected thereto which are 180 degrees out of phase relative to each other.

A final object of this invention to be specifically enumerated herein is to provide an amusement vehicle in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the amusement vehicle of the instant invention;

FIGURE 6 is an enlarged fragmentary top plan view of the rear portion of the vehicle;

FIGURES 7 and 8 are perspective views of portions of the drive mechanism.

Figure 2:
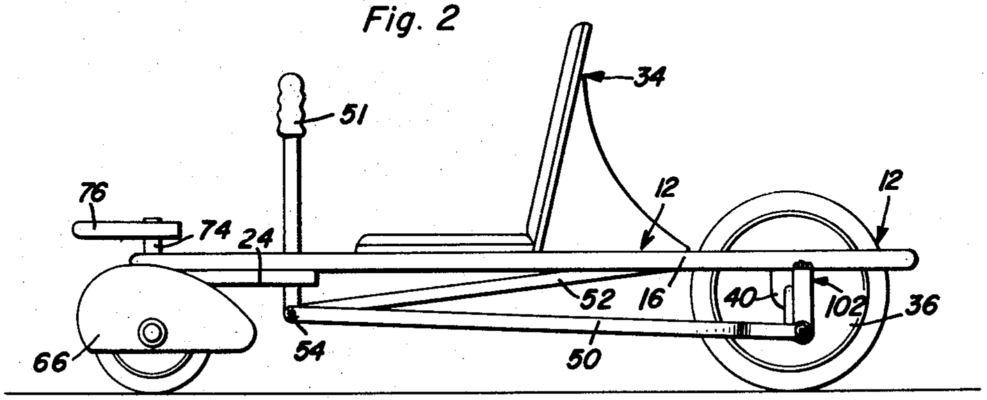
FIGURE 2 is a side elevational view of the embodiment illustrated in FIGURE 1.
Figure 3:
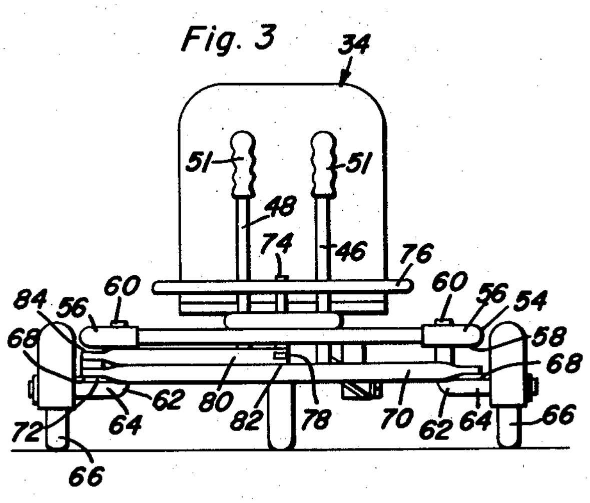
FIGURE 3 is a front end elevational view of the vehicle.

Referring now more specifically to the drawings the numeral 10 generally designates the vehicle of the instant invention which may be seen to include a main frame generally referred to by the reference numeral 12.

The main frame 12 includes a main section 14 which is constructed of a single piece of tubing including a pair of longitudinal side members 16 and 18 interconnected at corresponding ends by means of rounded end portions 20 and 22. The main frame 12 also includes a forward section 24 and the forward section 24 may be seen to include a pair of laterally directed arms 26 and 28. Each of the arms 26 and 28 is generally U-shaped in configuration and the forward section 24 is formed of a single piece of tubing whose opposite ends are secured to the longitudinal side members 16 and 18 as at 30 and 32 respectively.

A seat construction 34 is fixedly supported on the main frame 12 intermediate the opposite ends of the longitudinal members 16 and 18 in any convenient manner and a rear drive wheel 36 is journaled for rotation between the rear ends of the longitudinal members 16 and 18 by means of an axle 38 whose opposite ends are journaled in depending portions 40 dependingly supported from the longitudinal members 16 and 18. The opposite ends of the axle 38 are provided with crankarms 42 and 44 and it may be seen that a pair of lever arms 46 and 48 are pivotally secured to a transverse shaft 49 secured between the longitudinal members 16 and 18 and that the upper ends of the lever arms 46 and 48 are provided with hand grips 51. The lever arms 46 and 48 have a pair of connecting rods 50 and 52 pivotally secured to their lower ends by means of pivot pins 54, see FIGURE 2 and the rear ends of the connecting rods 50 and 52 are pivotally secured to the crankarms 42 and 44 as will be hereinafter more fully set forth.

The outer ends of the arms 26 and 28 have end caps 54 secured thereto and each end cap 54 includes a pair of upper and lower plates 56 and 58 which are provided with aligned bores through which an upstanding leg 60 of an axle 62 is rotatably received. Each axle 62 includes a horizontal leg or arm 64 on which there is rotatably journaled a front wheel 66.

A mounting plate 68 is fixedly secured to each of the horizontal legs or arms 64 and the mounting plates 68 are interconnected by means of a connecting rod 70 whose opposite ends are pivotally secured to the mounting plate 68 as at 72.

A steering shaft 74 is rotatably journaled for rotation about an upstanding axis from the main frame 12 in any convenient manner and has a foot bar 76 secured to its upper end. One end of a steering arm 78 is fixedly secured to the lower end of the steering shaft 74 and the free end of the steering arm 78 is pivotally secured to one end of a rod 80 by means of a pivot fastener 82 while the other end of the rod 80 is pivotally secured to an end of the connecting or tie rod 70 as at 84.

Accordingly, it may be seen that the front wheels 66 may be steered by rotating the foot bar 76 about its axis of rotation defined by the steering shaft 74. The foot bar 76 is provided with a pair of foot pads 88 and 90 adapted to be engaged by the foot of an operator seated on the seat 34.

Other than the structural details of the steering assembly and main frame 12, the preceding description can be considered as conventional with the exception being that conventional Irish Mail-types of vehicles are usually provided with only one actuating lever and not a pair of actuating levers such as actuating levers or lever arms 46 and 48 which are connected to the axles 38 in 180 degrees out-of-phase relationship relative to each other.

It may be seen from FIGURE 6 of the drawings that the crankarms 42 and 44 project in opposite directions and therefore it may be appreciated that the lever arms 46 and 48 are connected to the axle 38 in 180 degrees out-of-phase relationship relative to each other.

With attention now directed to FIGURES 4 through 8 of the drawings it may be seen that each of the crankarms 42 and 44 has an L-shaped bracket generally referred to by reference numeral 90 secured thereto in any convenient manner such as by welding. Each of the L-shaped brackets 90 includes a flange 92 which may be welded to the corresponding crankarm and a flange 94 which has an arcuate slot 96 formed therein. One end of the L-shaped brackets 90 is provided with an end wall 98 having an aperture 100 therein and the end wall 98 interconnects corresponding ends of the associated flanges 92 and 94.

As can best be seen in FIGURE 8 of the drawings, each of the L-shaped brackets 90 has a corresponding L-shaped bracket 102 provided with a long leg 104 apertured as at 106 and a short leg 108 apertured as at 110. The rear end of each connecting rod is secured to the leg 104 of the corresponding bracket 102 by means of a fastener 112 which is secured through and fixed relative to that connecting rod and is passed through the corresponding aperture 106 and slidably secured through the corresponding slot 96 by means of a retaining element 114. An expansion spring 116 is secured between the short leg 108 and the corresponding end wall 98 and has its opposite ends secured through the apertures 100 and 110.

Figure 4:
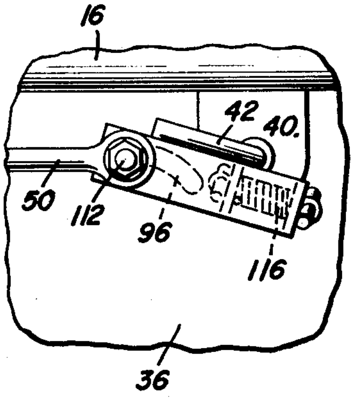
FIGURES 4 and 5 are enlarged fragmentary side elevational views of a portion of the drive mechanism of the vehicle with the shiftable portions of the drive mechanism shown in different positions relative to each other.
Figure 5:
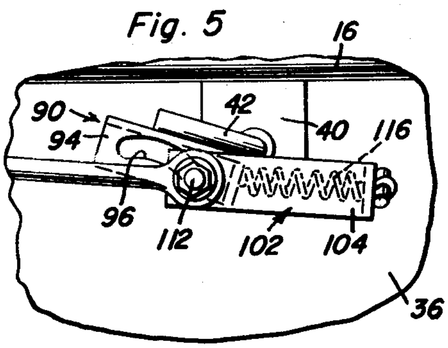

In operation, and assuming that the drive mechanism of the vehicle 10 is disposed as shown in FIGURE 4 of the drawings with the longitudinal axes of the connecting rods 50 and 52 aligned with a line extending between the axis of rotation of the connecting rod arm and the axis of rotation of the axle 38, without the lost motion connection defined by the fastener 112 and the slot 96, no amount of force imparted to the lever arms 46 and 48 from the vehicle 10 would be capable of imparting rotary movement to the drive wheel 36. However, because the lost motion connection is provided, the application of thrust on the actuating lever arm 46 in a forward direction in order to impart rearward movement of the connecting rod 50 relative to the L-shaped bracket 90 will cause the fastener 112 to slide from the forward end of the slot 96 as viewed in FIGURE 4 of the drawings to the rear end of the slot 96 as shown in FIGURE 5 of the drawings. At this point, it may be seen that the axis of rotation defined by the pivot fastener 112 has been laterally offset. This lateral shifting of the fastener 112 causes a line extending between the axis of rotation of the axle 38 and the fastener 112 to be disposed at an angle relative to the longitudinal axis of the connecting rod 56 thereby moving the drive mechanism out of a dead center position and enabling continued rearward thrust on the connecting rod 56 to impart rotary motion to the drive wheel 36 in a counter-clockwise direction as viewed in FIGURE 5 of the drawings.

As the springs 116 normally urge the fasteners 112 to the outermost limits of the slots 96, the vehicle 10 may be operated in the usual manner whenever desired. However, should the drive mechanisms be disposed in the aforementioned dead center positions when the vehicle 10 is stationary, one of the lever arms 46 and 48 may have its upper end urged forwardly with sufficient thrust to expand the corresponding expansion spring 116 and to move the corresponding fastener 112 to the innermost end of the corresponding slot 96. As soon as the lateral displacing of the corresponding fastener 112 has enabled continued force on the actuating lever or lever arm to impart rotary movement to the drive wheel 36, the other lever arm may have force applied thereto in the opposite direction in the conventional manner to further apply force to the drive mechanisms for imparting rotary movement to the drive wheel 36.

Inasmuch as the drive mechanisms defined by the lever arms 46 and 48, the connecting rods 50 and 52, and the crankarms 42 and 44 are 180 degrees out-of-phase relative to each other, as soon as one of the lever arms 46 and 48 has had force applied thereto to effect lateral shifting of the pivotal connection between the corresponding connecting rod and crankarm, the other lever handle may have force applied thereto in the conventional manner.

Although the slots 96 have been illustrated and described as being arcuate, it is to be noted that they may be straight and inclined relative to the longitudinal axis of the corresponding crankarms.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An amusement vehicle including frame means having at least one front supporting wheel assembly and one rear supporting wheel assembly, at least one of said assemblies being supported from said frame means for rotation about an upstanding axis for steering said vehicle, the wheel of the other of said assemblies having a crankarm connected thereto, an elongated connecting rod, means pivotally connecting one end of said rod to the free end of said crankarm, motion effecting means movably mounted on said frame means for guided movement and having the other end of said connecting rod pivotally connected thereto for effecting longitudinal oscillatory movement of said rod in response to movement of said motion effecting means, said means pivotally connecting said one end of said rod to the free end of said crankarm including first and second coacting means carried by said rod and crankarm enabling movement of said one end of said rod between two limit positions defining a line therebetween extending in a direction inclined at least slightly relative to the longitudinal center line of said crankarm and disposed in the plane through which said crankarm is swingable, and means yieldably urging movement of said one end of said rod relative to said arm toward the limit position disposed furthermost from the axis of rotation of said other wheel.

2. The combination of claim 1 wherein said vehicle includes a pair of front wheel assemblies including said one front wheel assembly and which are supported from opposite sides of said frame means and are each supported from the latter for rotation about an upstanding axis, means interconnecting said front assemblies for like swinging movement together and including a horizontally disposed tiller bar pivotally supported from said frame means intermediate its opposite ends for rotation about an upstanding axis and including opposite end portions adapted to be engaged by the feet of the operator of said vehicle.

3. The combination of claim 2 wherein said vehicle includes a seat disposed between said front and rear wheel assemblies, said motion effecting means comprising at least one lever handle pivotally secured, intermediate its opposite ends, to said frame means for rotation about a horizontally disposed axis extending transversely of said lever handle and said frame means, said connecting rod having said other end thereof pivotally secured to said lever handle at a point spaced from the last mentioned axis and the upper end of said lever handle being adapted to be grasped by the hand of the operator of said vehicle.

4. The combination of claim 3 wherein the axis of rotation of said lever handle is disposed between said seat and said front wheel assemblies.

5. The combination of claim 4 wherein said other assembly comprises said rear wheel assembly, said rear wheel assembly including an additional crankarm disposed on the opposite side of the rear wheel from said first-mentioned crankarm, an additional elongated connecting rod for said additional crankarm, said motion effecting means including an additional lever handle, means pivotally connecting the additional lever handle to said additional crankarm and to said additional connecting rod.

6. The combination of claim 1 wherein said means pivotally connecting said one end of said rod to the free end of said crankarm comprises a laterally directed end portion comprising the first of said coacting means on said rod slidably and rotatably received in slot defining means comprising the second of said coacting means on said crankarm extending generally longitudinally of said crankarm.

7. The combination of claim 6 wherein said slot defining means includes slot ends defining limits between which said end portion is movable.

8. The combination of claim 7 wherein the end of the slot remote from the axis of rotation of the wheel of said rear wheel assembly extends substantially radially of the last mentioned axis, said slot being generally arcuate in plan.

9. An amusement vehicle including frame means having at least one rotatable drive wheel with a crankarm connected thereto, an elongated connecting rod, means pivotally connecting one end of said rod to the free end of said crankarm, motion effecting means movably mounted on said frame means for guided movement and having the other end of said connecting rod pivotally connected thereto for effecting longitudinal oscillatory movement of said rod in response to movement of said motion-effecting means, said means pivotally connecting said one end of said rod to the free end of said crankarm including first and second coacting means carried by said rod and crankarm enabling movement of said one end of said rod between two limit positions defining a line therebetween extending in a direction inclined at least slightly relative to the longitudinal centerline of said crankarm and disposed in a plane through which said crankarm is swingable, and means yieldably urging movement of said one end of said rod relative to said arm toward the limit position disposed furthermost from the axis of rotation of said drive wheel.

References Cited in the file of this patent

UNITED STATES PATENTS

| | | |
|---|---|---|
| 653,176 | Grider | July 3, 1900 |
| 1,503,878 | Brady | Aug. 5, 1924 |
| 2,481,683 | Polacek | Sept. 13, 1949 |
| 2,707,112 | Ludwigson et al. | Apr. 26, 1955 |
| 2,795,414 | Wise | June 11, 1957 |
| 2,872,914 | Fahrni | Feb. 10, 1959 |
| 2,940,330 | Parsons | June 14, 1960 |